(12) United States Patent
Phan et al.

(10) Patent No.: US 10,740,911 B2
(45) Date of Patent: Aug. 11, 2020

(54) METHOD, SYSTEM AND APPARATUS FOR CORRECTING TRANSLUCENCY ARTIFACTS IN DATA REPRESENTING A SUPPORT STRUCTURE

(71) Applicant: SYMBOL TECHNOLOGIES, LLC, Lincolnshire, IL (US)

(72) Inventors: Raymond Phan, Mississauga (CA); Richard Jeffrey Rzeszutek, Toronto (CA); Iaacov Coby Segall, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 192 days.

(21) Appl. No.: 15/946,165

(22) Filed: Apr. 5, 2018

(65) Prior Publication Data

US 2019/0311486 A1    Oct. 10, 2019

(51) Int. Cl.
*G06T 7/50*    (2017.01)
*G06K 9/00*    (2006.01)
(Continued)

(52) U.S. Cl.
CPC ............ *G06T 7/50* (2017.01); *G06K 9/00664* (2013.01); *G06T 7/13* (2017.01); *G06T 7/337* (2017.01); *G06T 2207/10028* (2013.01)

(58) Field of Classification Search
CPC .... G06T 7/13; G06T 7/50; G06T 7/60; G06T 7/70; G06K 9/00201; G06K 9/00664; G06Q 10/087; H04N 13/271
See application file for complete search history.

(56) References Cited

U.S. PATENT DOCUMENTS

| 5,214,615 A | 5/1993 | Bauer ........................ 367/128 |
| 5,408,322 A | 4/1995 | Hsu et al. .................... 356/369 |

(Continued)

FOREIGN PATENT DOCUMENTS

| CA | 2835830 A1 | 11/2012 |
| CA | 3028156 A1 | 1/2018 |

(Continued)

OTHER PUBLICATIONS

International Search Report and Written Opinion for International Patent Application No. PCT/US2013/070996 dated Apr. 2, 2014.
(Continued)

*Primary Examiner* — Andrew W Johns

(57) ABSTRACT

A method in an imaging controller of correcting translucency artifacts in data representing one or more objects disposed on a shelf includes: obtaining a plurality of depth measurements captured by a depth sensor and corresponding to an area containing the shelf; obtaining (i) a definition of a plane containing edges of the shelf, (ii) a location in the plane of an upper shelf edge, and (iii) a location in the plane of a lower shelf edge adjacent to the upper shelf edge; generating a depth map containing, for each of a plurality of positions in the plane, a nearest object depth; detecting an upper object boundary in the depth map between the upper and lower support surface edges; updating each nearest object depth between the upper object boundary and the lower shelf edge to contain a depth of the upper object boundary; and storing the corrected depth map.

20 Claims, 10 Drawing Sheets

(51) Int. Cl.
*G06T 7/13* (2017.01)
*G06T 7/33* (2017.01)

(56) References Cited

U.S. PATENT DOCUMENTS

| | | | |
|---|---|---|---|
| 5,414,268 A | 5/1995 | McGee | 250/560 |
| 5,534,762 A | 7/1996 | Kim | 318/568.12 |
| 5,566,280 A | 10/1996 | Fukui et al. | 395/119 |
| 5,953,055 A | 9/1999 | Huang et al. | 348/155 |
| 5,988,862 A | 11/1999 | Kacyra et al. | 364/578 |
| 6,026,376 A | 2/2000 | Kenney | 705/27 |
| 6,034,379 A | 3/2000 | Bunte et al. | 250/566 |
| 6,075,905 A | 6/2000 | Herman et al. | 382/284 |
| 6,115,114 A | 9/2000 | Berg et al. | 356/5.13 |
| 6,141,293 A | 10/2000 | Amorai-Moriya et al. | 367/127 |
| 6,304,855 B1 | 10/2001 | Burke | 705/27 |
| 6,442,507 B1 | 8/2002 | Skidmore et al. | 702/186 |
| 6,549,825 B2 | 4/2003 | Kurata | 700/245 |
| 6,580,441 B2 | 6/2003 | Schileru-Key | 345/805 |
| 6,711,293 B1 | 3/2004 | Lowe | 382/219 |
| 6,721,769 B1 | 4/2004 | Rappaport et al. | 707/205 |
| 6,836,567 B1 | 12/2004 | Silver et al. | 382/209 |
| 6,995,762 B1 | 2/2006 | Pavlidis et al. | 345/419 |
| 7,090,135 B2 | 8/2006 | Patel | 235/462.2 |
| 7,137,207 B2 | 11/2006 | Armstrong et al. | 33/286 |
| 7,245,558 B2 | 7/2007 | Willins et al. | 367/124 |
| 7,248,754 B2 | 7/2007 | Cato | 382/318 |
| 7,277,187 B2 | 10/2007 | Smith et al. | 365/601 |
| 7,373,722 B2 | 5/2008 | Cooper et al. | 33/1 V |
| 7,474,389 B2 | 1/2009 | Greenberg et al. | 356/5.1 |
| 7,487,595 B2 | 2/2009 | Armstrong et al. | 33/286 |
| 7,493,336 B2 | 2/2009 | Noonan | 707/104.1 |
| 7,508,794 B2 | 3/2009 | Feather et al. | 370/331 |
| 7,527,205 B2 | 5/2009 | Zhu et al. | 235/462.14 |
| 7,605,817 B2 | 10/2009 | Zhang et al. | 345/473 |
| 7,647,752 B2 | 1/2010 | Magnell | 53/504 |
| 7,693,757 B2 | 4/2010 | Zimmerman | 705/28 |
| 7,726,575 B2 | 6/2010 | Wang et al. | 235/462.42 |
| 7,751,928 B1 | 7/2010 | Antony et al. | 700/214 |
| 7,783,383 B2 | 8/2010 | Eliuk et al. | 700/245 |
| 7,839,531 B2 | 11/2010 | Sugiyama | 358/1.18 |
| 7,845,560 B2 | 12/2010 | Emanuel et al. | 235/462.08 |
| 7,885,865 B2 | 2/2011 | Benson et al. | 705/28 |
| 7,925,114 B2 | 4/2011 | Mai et al. | 382/284 |
| 7,957,998 B2 | 6/2011 | Riley et al. | 705/7.12 |
| 7,996,179 B2 | 8/2011 | Lee et al. | 702/153 |
| 8,009,864 B2 | 8/2011 | Linaker et al. | 382/103 |
| 8,049,621 B1 | 11/2011 | Egan | 340/572.1 |
| 8,091,782 B2 | 1/2012 | Cato et al. | 235/385 |
| 8,094,902 B2 | 1/2012 | Crandall et al. | 382/128 |
| 8,094,937 B2 | 1/2012 | Teoh et al. | 382/180 |
| 8,132,728 B2 | 3/2012 | Dwinell et al. | 235/454 |
| 8,134,717 B2 | 3/2012 | Pangrazio et al. | 365/614 |
| 8,189,855 B2 | 5/2012 | Opalach et al. | 382/100 |
| 8,199,977 B2 | 6/2012 | Krishnaswamy et al. | 382/106 |
| 8,207,964 B1 | 6/2012 | Meadow et al. | 345/419 |
| 8,233,055 B2 | 7/2012 | Matsunaga et al. | 348/222.1 |
| 8,265,895 B2 | 9/2012 | Willins et al. | 702/150 |
| 8,277,396 B2 | 10/2012 | Scott et al. | 600/595 |
| 8,284,988 B2 | 10/2012 | Sones et al. | 382/101 |
| 8,423,431 B1 | 4/2013 | Rouaix et al. | 705/28 |
| 8,429,004 B2 | 4/2013 | Hamilton et al. | 705/7.41 |
| 8,463,079 B2 | 6/2013 | Ackley et al. | 382/312 |
| 8,479,996 B2 | 7/2013 | Barkan et al. | 235/462.43 |
| 8,520,067 B2 | 8/2013 | Ersue | 348/139 |
| 8,542,252 B2 | 9/2013 | Perez et al. | 345/649 |
| 8,599,303 B2 | 12/2013 | Stettner | 384/348 |
| 8,630,924 B2 | 1/2014 | Groenevelt et al. | 705/28 |
| 8,660,338 B2 | 2/2014 | Ma et al. | 382/154 |
| 8,743,176 B2 | 6/2014 | Stettner et al. | H04N 13/0055 |
| 8,757,479 B2 | 6/2014 | Clark et al. | 235/375 |
| 8,812,226 B2 | 8/2014 | Zeng | 701/301 |
| 8,923,893 B2 | 12/2014 | Austin et al. | 455/457 |
| 8,939,369 B2 | 1/2015 | Olmstead et al. | 235/438 |
| 8,954,188 B2 | 2/2015 | Sullivan et al. | B65G 1/1371 |
| 8,958,911 B2 | 2/2015 | Wong et al. | B25J 9/1694 |
| 8,971,637 B1 | 3/2015 | Rivard | 882/199 |
| 8,989,342 B2 | 3/2015 | Liesenfelt et al. | G01N 23/203 |
| 9,007,601 B2 | 4/2015 | Steffey et al. | G01B 11/14 |
| 9,037,287 B1 | 5/2015 | Grauberger et al. | G08B 13/19684 |
| 9,064,394 B1 | 6/2015 | Trundle | G08B 13/19684 |
| 9,070,285 B1 | 6/2015 | Ramu et al. | G08G 5/0091 |
| 9,129,277 B2 | 9/2015 | MacIntosh | G06Q 20/208 |
| 9,135,491 B2 | 9/2015 | Morandi et al. | G06K 9/00 |
| 9,159,047 B2 | 10/2015 | Winkel | G06Q 10/087 |
| 9,171,442 B2 | 10/2015 | Clements | G08B 13/248 |
| 9,247,211 B2 | 1/2016 | Zhang et al. | H04N 7/18 |
| 9,329,269 B2 | 5/2016 | Zeng | G01S 17/58 |
| 9,349,076 B1 | 5/2016 | Liu et al. | G06K 9/6256 |
| 9,367,831 B1 | 6/2016 | Besehanic | G06Q 10/087 |
| 9,380,222 B2 | 6/2016 | Clayton et al. | H04N 5/272 |
| 9,396,554 B2 | 7/2016 | Williams et al. | G06T 7/602 |
| 9,424,482 B2 | 8/2016 | Patel et al. | G06K 9/4604 |
| 9,517,767 B1 | 12/2016 | Kentley et al. | B60W 30/08 |
| 9,542,746 B2 | 1/2017 | Wu et al. | G06T 7/0044 |
| 9,549,125 B1 | 1/2017 | Goyal et al. | H04N 5/23287 |
| 9,562,971 B2 | 2/2017 | Shenkar et al. | G01S 17/023 |
| 9,565,400 B1 | 2/2017 | Curlander et al. | H04N 7/181 |
| 9,600,731 B2 | 3/2017 | Yasunaga et al. | G06K 9/18 |
| 9,600,892 B2 | 3/2017 | Patel et al. | G06T 7/0081 |
| 9,639,935 B1 | 5/2017 | Douady-Pleven et al. | G06T 7/0018 |
| 9,697,429 B2 | 7/2017 | Patel et al. | G06K 9/00771 |
| 9,766,074 B2 | 9/2017 | Roumeliotis et al. | G01C 21/16 |
| 9,778,388 B1 | 10/2017 | Connor | G01V 1/3817 |
| 9,791,862 B1 | 10/2017 | Connor | G05D 1/0206 |
| 9,805,240 B1 | 10/2017 | Zheng et al. | G06K 7/1447 |
| 9,811,754 B2 | 11/2017 | Schwartz | G06K 9/46 |
| 9,827,683 B1 | 11/2017 | Hance et al. | B25J 19/021 |
| 9,880,009 B2 | 1/2018 | Bell | G01C 21/206 |
| 9,928,708 B2 | 3/2018 | Lin et al. | G08B 13/19608 |
| 9,980,009 B2 | 5/2018 | Jiang et al. | H04N 21/482 |
| 9,994,339 B2 | 6/2018 | Colson et al. | B65B 3/022 |
| 10,019,803 B2 | 7/2018 | Venable et al. | G06T 7/0057 |
| 10,111,646 B2 | 10/2018 | Nycz et al. | A61B 8/0875 |
| 10,121,072 B1 | 11/2018 | Kekatpure | G06K 9/00449 |
| 10,127,438 B1 | 11/2018 | Fisher et al. | G06K 9/00335 |
| 10,197,400 B2 | 2/2019 | Jesudason et al. | G01C 21/20 |
| 10,210,603 B2 | 2/2019 | Venable et al. | G06T 5/006 |
| 10,229,386 B2 | 3/2019 | Thomas | G06Q 10/087 |
| 10,248,653 B2 | 4/2019 | Blassin et al. | G06F 17/289 |
| 10,265,871 B2 | 4/2019 | Hance et al. | B25J 19/021 |
| 10,289,990 B2 | 5/2019 | Rizzolo et al. | G06Q 20/201 |
| 10,336,543 B1 | 7/2019 | Sills et al. | B65G 1/1373 |
| 10,349,031 B2 | 7/2019 | DeLuca | H04N 13/106 |
| 10,352,689 B2 | 7/2019 | Brown et al. | G01B 11/22 |
| 10,394,244 B2 | 8/2019 | Song et al. | G05D 1/0217 |
| 2001/0041948 A1 | 11/2001 | Ross et al. | 700/226 |
| 2002/0006231 A1 | 1/2002 | Jayant et al. | 382/266 |
| 2002/0097439 A1 | 7/2002 | Braica | 358/3.26 |
| 2002/0146170 A1 | 10/2002 | Rom | 382/175 |
| 2002/0158453 A1 | 10/2002 | Levine | 280/735 |
| 2002/0164236 A1 | 11/2002 | Fukuhara et al. | 414/373 |
| 2003/0003925 A1 | 1/2003 | Suzuki | 455/456 |
| 2003/0094494 A1 | 5/2003 | Blanford et al. | 235/462.07 |
| 2003/0174891 A1 | 9/2003 | Wenzel et al. | 382/209 |
| 2004/0021313 A1 | 2/2004 | Gardner et al. | 283/81 |
| 2004/0131278 A1 | 7/2004 | imagawa et al. | 382/284 |
| 2004/0240754 A1 | 12/2004 | Smith et al. | 382/286 |
| 2005/0016004 A1 | 1/2005 | Armstrong et al. | 33/286 |
| 2005/0114059 A1 | 5/2005 | Chang et al. | 702/84 |
| 2005/0213082 A1 | 9/2005 | DiBernardo et al. | 356/139.03 |
| 2005/0213109 A1 | 9/2005 | Schell et al. | 356/614 |
| 2006/0032915 A1 | 2/2006 | Schwartz | 235/383 |
| 2006/0045325 A1 | 3/2006 | Zavadsky et al. | 382/145 |
| 2006/0106742 A1 | 5/2006 | Bochicchio et al. | 705/414 |
| 2006/0285486 A1 | 12/2006 | Roberts et al. | 370/216 |
| 2007/0036398 A1 | 2/2007 | Chen | 382/118 |
| 2007/0074410 A1 | 4/2007 | Armstrong et al. | 33/286 |
| 2007/0272732 A1 | 11/2007 | Hindmon | 235/375 |
| 2008/0002866 A1 | 1/2008 | Fujiwara | 382/118 |
| 2008/0025565 A1 | 1/2008 | Zhang et al. | 382/103 |

(56) References Cited

U.S. PATENT DOCUMENTS

| | | |
|---|---|---|
| 2008/0027591 A1 | 1/2008 | Lenser et al. .................... 701/2 |
| 2008/0077511 A1 | 3/2008 | Zimmerman ..................... 705/28 |
| 2008/0159634 A1 | 7/2008 | Sharma et al. ................. 382/224 |
| 2008/0164310 A1 | 7/2008 | Dupuy et al. .................. 235/385 |
| 2008/0175513 A1 | 7/2008 | Lai et al. ...................... 382/267 |
| 2008/0181529 A1 | 7/2008 | Michel et al. ................. 382/266 |
| 2008/0238919 A1 | 10/2008 | Pack .............................. 345/420 |
| 2008/0294487 A1 | 11/2008 | Nasser ............................. 705/8 |
| 2009/0009123 A1 | 1/2009 | Skaff ......................... 318/568.12 |
| 2009/0024353 A1 | 1/2009 | Lee et al. ..................... 702/153 |
| 2009/0057411 A1 | 3/2009 | Madej et al. ............... 235/462.11 |
| 2009/0059270 A1 | 3/2009 | Opalach et al. .............. 358/1.15 |
| 2009/0060349 A1 | 3/2009 | Linaker et al. ............... 382/209 |
| 2009/0063306 A1 | 3/2009 | Fano et al. ..................... 705/28 |
| 2009/0063307 A1 | 3/2009 | Groenovelt et al. ............ 705/28 |
| 2009/0074303 A1 | 3/2009 | Filimonova et al. ......... 382/224 |
| 2009/0088975 A1 | 4/2009 | Sato et al. ..................... 701/214 |
| 2009/0103773 A1 | 4/2009 | Wheeler et al. ............... 382/100 |
| 2009/0125350 A1 | 5/2009 | Lessing et al. ................... 705/7 |
| 2009/0125535 A1 | 5/2009 | Basso et al. ................... 707/100 |
| 2009/0152391 A1 | 6/2009 | McWhirk ......................... 244/30 |
| 2009/0160975 A1 | 6/2009 | Kwan ........................ 348/231.99 |
| 2009/0192921 A1 | 7/2009 | Hicks .............................. 705/28 |
| 2009/0206161 A1 | 8/2009 | Olmstead ................... 235/462.41 |
| 2009/0236155 A1 | 9/2009 | Skaff .............................. 180/8.6 |
| 2009/0252437 A1 | 10/2009 | Li et al. ......................... 382/289 |
| 2009/0323121 A1 | 12/2009 | Valkenburg et al. .......... 358/1.18 |
| 2010/0026804 A1 | 2/2010 | Tanizaki et al. ............... 348/148 |
| 2010/0070365 A1 | 3/2010 | Siotia et al. .................. 705/14.49 |
| 2010/0082194 A1 | 4/2010 | Yabushita et al. ............... 701/25 |
| 2010/0091094 A1 | 4/2010 | Sekowski ........................ 348/50 |
| 2010/0118116 A1 | 5/2010 | Tomasz et al. ................... 348/36 |
| 2010/0131234 A1 | 5/2010 | Stewart et al. ................ 702/152 |
| 2010/0141806 A1 | 6/2010 | Uemura et al. ................. 348/241 |
| 2010/0171826 A1 | 7/2010 | Hamilton et al. .............. 348/135 |
| 2010/0208039 A1 | 8/2010 | Stettner ........................... 348/46 |
| 2010/0214873 A1 | 8/2010 | Somasundaram et al. ..... 367/99 |
| 2010/0241289 A1 | 9/2010 | Sandberg .......................... 701/2 |
| 2010/0295850 A1 | 11/2010 | Katz et al. ..................... 345/421 |
| 2010/0315412 A1 | 12/2010 | Sinha et al. .................... 345/419 |
| 2010/0326939 A1 | 12/2010 | Clark et al. .................... 311/153 |
| 2011/0047636 A1 | 2/2011 | Stachon et al. ................. 800/260 |
| 2011/0052043 A1 | 3/2011 | Hyung et al. ................... 382/154 |
| 2011/0093306 A1 | 4/2011 | Nielsen et al. ................ 705/7.13 |
| 2011/0137527 A1 | 6/2011 | Simon et al. ...................... 101/45 |
| 2011/0168774 A1 | 7/2011 | Magal .............................. 235/375 |
| 2011/0172875 A1 | 7/2011 | Gibbs ............................... 701/33 |
| 2011/0216063 A1 | 9/2011 | Hayes ............................. 345/423 |
| 2011/0242286 A1 | 10/2011 | Pace et al. ........................ 348/47 |
| 2011/0254840 A1 | 10/2011 | Halstead ......................... 345/421 |
| 2011/0286007 A1 | 11/2011 | Pangrazio et al. ............. 356/614 |
| 2011/0288816 A1 | 11/2011 | Thierman ....................... 702/151 |
| 2011/0310088 A1 | 12/2011 | Adabala et al. ................ 345/419 |
| 2012/0019393 A1 | 1/2012 | Wolinsky et al. ........... 340/686.1 |
| 2012/0022913 A1 | 1/2012 | Volkmann et al. ........... 705/7.29 |
| 2012/0069051 A1 | 3/2012 | Hagbi et al. .................... 345/633 |
| 2012/0075342 A1 | 3/2012 | Choubassi et al. ............. 345/633 |
| 2012/0133639 A1 | 5/2012 | Kopf et al. ..................... 345/419 |
| 2012/0169530 A1 | 7/2012 | Padmanabhan et al. ...... 342/146 |
| 2012/0179621 A1 | 7/2012 | Moir et al. ..................... 705/332 |
| 2012/0185112 A1 | 7/2012 | Sung et al. ........................ 701/1 |
| 2012/0194644 A1 | 8/2012 | Newcombe et al. ............. 348/46 |
| 2012/0197464 A1 | 8/2012 | Wang et al. ....................... 701/2 |
| 2012/0201466 A1 | 8/2012 | Funayama et al. ............. 382/218 |
| 2012/0209553 A1 | 8/2012 | Doytchinov et al. ............ 702/81 |
| 2012/0236119 A1 | 9/2012 | Rhee et al. ....................... 348/46 |
| 2012/0249802 A1 | 10/2012 | Taylor ............................. 848/169 |
| 2012/0250978 A1 | 10/2012 | Taylor ............................. 382/154 |
| 2012/0269383 A1 | 10/2012 | Bobbitt et al. ................. 382/103 |
| 2012/0287249 A1 | 11/2012 | Choo et al. ....................... 348/47 |
| 2012/0307108 A1 | 12/2012 | Forutanpour ................ 384/231.3 |
| 2012/0323620 A1 | 12/2012 | Hofman et al. ............... 705/7.11 |
| 2013/0030700 A1 | 1/2013 | Miller et al. ................... 701/500 |
| 2013/0119138 A1 | 5/2013 | Winkel ................ G06Q 10/087 |
| 2013/0132913 A1 | 5/2013 | Fu et al. ........................... 716/51 |
| 2013/0134178 A1 | 5/2013 | Lu .................................... 221/1 |
| 2013/0138246 A1 | 5/2013 | Gutmann et al. ..... G05D 1/0231 |
| 2013/0142421 A1 | 6/2013 | Silver et al. .......... G06K 9/6201 |
| 2013/0144565 A1 | 6/2013 | Miller et al. ...................... 703/1 |
| 2013/0154802 A1 | 6/2013 | O'Haire et al. .............. 340/10.1 |
| 2013/0156292 A1 | 6/2013 | Chang et al. .................. 382/141 |
| 2013/0162806 A1 | 6/2013 | Ding et al. ....................... 348/86 |
| 2013/0176398 A1 | 7/2013 | Bonner et al. .......... G03B 21/10 |
| 2013/0178227 A1 | 7/2013 | Vartanian et al. ....... H04W 4/04 |
| 2013/0182114 A1 | 7/2013 | Zhang et al. ............. H04N 7/18 |
| 2013/0226344 A1 | 8/2013 | Wong et al. ........... B25J 9/1694 |
| 2013/0228620 A1 | 9/2013 | Ahem et al. ................... 235/439 |
| 2013/0235165 A1 | 9/2013 | Gharib et al. ...... H04N 13/0207 |
| 2013/0236089 A1 | 9/2013 | Litvak et al. ....... G06K 9/00201 |
| 2013/0278631 A1 | 10/2013 | Border et al. ........ G02B 27/017 |
| 2013/0299306 A1 | 11/2013 | Jiang et al. ............ G01R 35/04 |
| 2013/0299313 A1 | 11/2013 | Baek, IV et al. ....... B65G 15/26 |
| 2013/0300729 A1 | 11/2013 | Grimaud ........................ 345/419 |
| 2013/0303193 A1 | 11/2013 | Dharwada et al. ... H04W 4/043 |
| 2013/0321418 A1 | 12/2013 | Kirk ................................ 345/423 |
| 2013/0329013 A1 | 12/2013 | Metois et al. ..... H04N 13/0203 |
| 2013/0341400 A1 | 12/2013 | Lancaster-Larocque ..... 235/454 |
| 2014/0002597 A1 | 1/2014 | Taguchi et al. ..... H04N 13/0275 |
| 2014/0003655 A1 | 1/2014 | Gopalkrishnan et al. .... 382/103 |
| 2014/0003727 A1 | 1/2014 | Lortz et al. .................... 382/218 |
| 2014/0016832 A1 | 1/2014 | Kong et al. ......... G06K 9/00885 |
| 2014/0019311 A1 | 1/2014 | Tanaka ................. G06Q 30/0643 |
| 2014/0025201 A1 | 1/2014 | Ryu et al. ................ G05D 1/02 |
| 2014/0028837 A1 | 1/2014 | Gao et al. ............... G01B 11/04 |
| 2014/0047342 A1 | 2/2014 | Breternitz et al. ............. 715/735 |
| 2014/0049616 A1 | 2/2014 | Stettner ................... G01B 11/24 |
| 2014/0052555 A1 | 2/2014 | MacIntosh ........... G06Q 20/208 |
| 2014/0086483 A1 | 3/2014 | Zhang et al. .............. G06K 9/64 |
| 2014/0098094 A1 | 4/2014 | Neumann et al. ....... G06T 17/10 |
| 2014/0100813 A1 | 4/2014 | Shaowering ........... G01B 21/00 |
| 2014/0104413 A1 | 4/2014 | McCloskey et al. ........................... G01G 19/002 |
| 2014/0156133 A1 | 6/2014 | Cullinane et al. ... G05D 1/0061 |
| 2014/0192050 A1 | 7/2014 | Qiu et al. ................ G06T 17/10 |
| 2014/0195374 A1 | 7/2014 | Bassemir et al. .. G06Q 30/0639 |
| 2014/0214547 A1 | 7/2014 | Signorelli et al. ........................... G06Q 30/0267 |
| 2014/0267614 A1 | 9/2014 | Ding et al. ......... H04N 13/0275 |
| 2014/0267688 A1 | 9/2014 | Aich et al. .............. H04N 7/181 |
| 2014/0277691 A1 | 9/2014 | Jacobus et al. ...... G06Q 10/087 |
| 2014/0277692 A1 | 9/2014 | Buzan et al. ......... B65G 1/1373 |
| 2014/0300637 A1 | 10/2014 | Fan et al. ............. G06K 9/6201 |
| 2014/0344401 A1 | 11/2014 | Varney et al. ....... H04L 67/1097 |
| 2014/0351073 A1 | 11/2014 | Murphy et al. ....... G06Q 10/083 |
| 2014/0369607 A1 | 12/2014 | Patel et al. ........ G06F 17/30247 |
| 2015/0015602 A1 | 1/2015 | Beaudoin ............... G06T 7/0004 |
| 2015/0019391 A1 | 1/2015 | Kumar et al. ........ G06Q 10/087 |
| 2015/0029339 A1 | 1/2015 | Kobres et al. .......... H04N 7/181 |
| 2015/0039458 A1 | 2/2015 | Reid ..................... G06Q 30/0601 |
| 2015/0088618 A1 | 3/2015 | Basir et al. ........... G07B 15/063 |
| 2015/0088703 A1 | 3/2015 | Yan ....................... G06Q 10/087 |
| 2015/0092066 A1 | 4/2015 | Geiss et al. ........... H04N 17/002 |
| 2015/0106403 A1 | 4/2015 | Haverinen et al. ........................... G06F 17/30607 |
| 2015/0117788 A1 | 4/2015 | Patel et al. ............. G06K 9/4604 |
| 2015/0139010 A1 | 5/2015 | Jeong et al. ........... H04W 48/20 |
| 2015/0154467 A1 | 6/2015 | Feng et al. ................ G06K 9/48 |
| 2015/0161793 A1 | 6/2015 | Takahashi ............. G06T 7/0026 |
| 2015/0170256 A1 | 6/2015 | Pettyjohn et al. ........................... G06Q 30/0639 |
| 2015/0181198 A1 | 6/2015 | Baele et al. ........ H04N 13/0246 |
| 2015/0245358 A1 | 8/2015 | Schmidt ............. H04W 72/0486 |
| 2015/0262116 A1 | 9/2015 | Katircioglu et al. ........................... G06Q 10/067 |
| 2015/0279035 A1 | 10/2015 | Wolski et al. ......... G06T 7/0018 |
| 2015/0298317 A1 | 10/2015 | Wang et al. ........... B25J 9/1689 |
| 2015/0352721 A1 | 12/2015 | Wicks et al. ......... B25J 9/1679 |
| 2015/0363625 A1 | 12/2015 | Wu et al. ................. G06K 9/146 |
| 2015/0363758 A1 | 12/2015 | Wu et al. ............. G06Q 20/201 |
| 2015/0379704 A1 | 12/2015 | Chandrasekar et al. ........................... G06T 7/004 |
| 2016/0026253 A1 | 1/2016 | Bradski et al. ......... G06F 3/017 |
| 2016/0044862 A1 | 2/2016 | Kocer .................... A01C 23/007 |
| 2016/0061591 A1 | 3/2016 | Pangrazio et al. ...... G01B 11/24 |

(56) References Cited

U.S. PATENT DOCUMENTS

| | | | |
|---|---|---|---|
| 2016/0070981 A1 | 3/2016 | Sasaki et al. | G06K 9/6202 |
| 2016/0092943 A1 | 3/2016 | Vigier et al. | G06Q 30/0281 |
| 2016/0012588 A1 | 4/2016 | Taguchi et al. | G06T 7/0018 |
| 2016/0104041 A1 | 4/2016 | bowers et al. | G06K 9/00483 |
| 2016/0107690 A1 | 4/2016 | Oyama et al. | B62D 15/0285 |
| 2016/0112628 A1 | 4/2016 | Super et al. | H04N 5/23216 |
| 2016/0114488 A1 | 4/2016 | Mascorro Medina et al. B25J 9/1697 |
| 2016/0129592 A1 | 5/2016 | Saboo et al. | B25J 9/1661 |
| 2016/0132815 A1 | 5/2016 | Itoko et al. | G06Q 10/06398 |
| 2016/0150217 A1 | 5/2016 | Popov | H04N 13/0239 |
| 2016/0156898 A1 | 6/2016 | Ren et al. | H04N 13/0055 |
| 2016/0163067 A1 | 6/2016 | Williams et al. | G06T 7/602 |
| 2016/0171336 A1 | 6/2016 | Schwartz | G06K 9/46 |
| 2016/0171429 A1 | 6/2016 | Schwartz | G06Q 10/087 |
| 2016/0171707 A1 | 6/2016 | Schwartz | G06T 7/0081 |
| 2016/0185347 A1 | 6/2016 | Lefevre et al. | B60W 30/0953 |
| 2016/0191759 A1 | 6/2016 | Somanath et al. | H04N 5/2253 |
| 2016/0253735 A1 | 9/2016 | Scudillo et al. | G06Q 30/0631 |
| 2016/0313133 A1 | 10/2016 | Zeng et al. | G01C 21/34 |
| 2016/0328618 A1 | 11/2016 | Patel et al. | G06K 9/00771 |
| 2016/0353099 A1 | 12/2016 | Thomson et al. | H04N 17/002 |
| 2016/0364634 A1 | 12/2016 | Davis et al. | G06K 9/78 |
| 2017/0004649 A1 | 1/2017 | Collet Romea et al. G06T 15/205 |
| 2017/0011281 A1 | 1/2017 | Dijkman et al. | G06K 9/66 |
| 2017/0011308 A1 | 1/2017 | Sun et al. | G06N 99/005 |
| 2017/0032311 A1 | 2/2017 | Rizzolo et al. | G06Q 10/087 |
| 2017/0041553 A1 | 2/2017 | Cao et al. | H04N 5/265 |
| 2017/0066459 A1 | 3/2017 | Singh | B61L 15/0081 |
| 2017/0074659 A1 | 3/2017 | Giurgiu et al. | G01C 21/005 |
| 2017/0150129 A1 | 5/2017 | Pangrazio | H04N 13/2082 |
| 2017/0193434 A1 | 7/2017 | Shah et al. | G06G 10/087 |
| 2017/0219338 A1 | 8/2017 | Brown et al. | G01B 11/22 |
| 2017/0219353 A1 | 8/2017 | Alesiani | G01C 21/20 |
| 2017/0227645 A1 | 8/2017 | Swope et al. | G01S 17/89 |
| 2017/0227647 A1 | 8/2017 | Baik | G06T 17/935 |
| 2017/0228885 A1 | 8/2017 | Baumgartner | G06T 7/62 |
| 2017/0261993 A1 | 9/2017 | Venable et al. | G05D 1/0248 |
| 2017/0262724 A1* | 9/2017 | Wu et al. | G06K 9/3233 |
| 2017/0280125 A1 | 9/2017 | Brown et al. | H04N 13/0018 |
| 2017/0286773 A1* | 10/2017 | Skaff et al. | G05D 1/0246 |
| 2017/0286901 A1 | 10/2017 | Skaff et al. | G06Q 10/087 |
| 2017/0323376 A1 | 11/2017 | Glaser et al. | G06Q 30/0643 |
| 2018/0001481 A1 | 1/2018 | Shah et al. | B25J 11/008 |
| 2018/0005035 A1 | 1/2018 | Bogolea et al. | G06K 9/00671 |
| 2018/0005176 A1 | 1/2018 | Williams et al. | G06G 10/087 |
| 2018/0020145 A1 | 1/2018 | Kotfis et al. | H04N 5/2352 |
| 2018/0051991 A1 | 2/2018 | Hong | G01C 21/20 |
| 2018/0053091 A1 | 2/2018 | Savvides et al. | G06N 3/08 |
| 2018/0053305 A1 | 2/2018 | Gu et al. | G06T 7/0081 |
| 2018/0101813 A1 | 4/2018 | Paat et al. | G06Q 10/087 |
| 2018/0114183 A1 | 4/2018 | Howell | G06Q 10/087 |
| 2018/0143003 A1 | 5/2018 | Clayton et al. | G01B 11/02 |
| 2018/0174325 A1 | 6/2018 | Fu et al. | G06T 7/75 |
| 2018/0204111 A1 | 7/2018 | Zadeh et al. | G06N 3/0454 |
| 2018/0281191 A1 | 10/2018 | Sinyavskiy et al. | B25J 9/1666 |
| 2018/0293442 A1 | 10/2018 | Fridental et al. | G06K 9/00771 |
| 2018/0313956 A1 | 11/2018 | Rzeszutek et al. | G01S 17/89 |
| 2018/0314260 A1 | 11/2018 | Jen et al. | G05D 1/0214 |
| 2018/0314908 A1 | 11/2018 | Lam | G06K 9/4671 |
| 2018/0315007 A1 | 11/2018 | Kingsford et al. | G06Q 10/087 |
| 2018/0315065 A1 | 11/2018 | Zhang et al. | G06Q 30/0206 |
| 2018/0315173 A1 | 11/2018 | Phan et al. | G06T 5/40 |
| 2018/0315865 A1 | 11/2018 | Haist et al. | H01L 31/02327 |
| 2019/0057588 A1 | 2/2019 | Savvides et al. G08B 13/19604 |
| 2019/0065861 A1 | 2/2019 | Savvides et al. | G06K 9/00771 |
| 2019/0073554 A1 | 3/2019 | Rzeszutek | G06K 9/4604 |
| 2019/0180150 A1 | 6/2019 | Taylor et al. | G06K 9/6267 |
| 2019/0197728 A1* | 6/2019 | Yamao | G06T 7/74 |

FOREIGN PATENT DOCUMENTS

| | | | |
|---|---|---|---|
| CN | 104200086 A | 12/2014 | |
| CN | 107067382 A | 8/2017 | |
| EP | 0766098 A1 | 4/1997 | G01S 5/30 |
| EP | 1311993 B1 | 5/2007 | G06F 17/50 |
| EP | 2309378 A2 | 4/2011 | G06F 3/147 |
| EP | 2439487 A1 | 4/2012 | G01B 11/00 |
| EP | 2472475 A1 | 7/2012 | G06T 19/00 |
| EP | 2562688 A2 | 2/2013 | |
| EP | 2662831 A2 | 11/2013 | G06T 7/00 |
| EP | 2693362 A1 | 2/2014 | |
| GB | 2323238 A | 9/1998 | H04N 5/225 |
| GB | 2330265 A | 4/1999 | H04N 5/262 |
| KR | 101234798 B1 | 2/2013 | |
| KR | 1020190031431 A | 3/2019 | G06Q 10/06 |
| WO | WO 99/23600 A1 | 5/1999 | |
| WO | WO 2003002935 A1 | 1/2003 | G01B 11/00 |
| WO | 2003025805 A1 | 3/2003 | G06F 17/60 |
| WO | 2006136958 A2 | 12/2006 | |
| WO | 2007042251 A2 | 4/2007 | G06T 5/00 |
| WO | WO 2008057504 A2 | 5/2008 | G08C 21/00 |
| WO | WO 2008154611 A2 | 12/2008 | G06K 7/10 |
| WO | WO 2012103199 A1 | 8/2012 | A63F 13/12 |
| WO | WO 2012103202 A1 | 8/2012 | G06F 17/00 |
| WO | WO 2012154801 A1 | 11/2012 | G06K 7/10 |
| WO | WO 2013165674 A1 | 11/2013 | G06T 7/00 |
| WO | WO 2014066422 A2 | 5/2014 | B60G 3/02 |
| WO | WO 2014092552 A2 | 6/2014 | |
| WO | 2014181323 A1 | 11/2014 | G06T 7/00 |
| WO | WO 2015127503 A1 | 9/2015 | B64F 1/36 |
| WO | WO 2016020038 A1 | 2/2016 | G01B 11/04 |
| WO | WO 2018018007 A1 | 1/2018 | G06Q 30/00 |
| WO | WO 2019023249 A1 | 1/2019 | G06Q 10/08 |

OTHER PUBLICATIONS

International Search Report and Written Opinion for International Patent Application No. PCT/US2013/053212 dated Dec. 1, 2014.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
Bohm, "Multi-Image Fusion for Occlusion-Free Facade Texturing", International Archives of the Photogrammetry, Remote Sensing and Spatial Information Sciences, pp. 867-872 (Jan. 2004).
Senthilkumaran, et al., "Edge Detection Techniques for Image Segmentation—A Survey of Soft Computing Approaches", International Journal of Recent Trends in Engineering, vol. 1, No. 2 (May 2009).
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).
Tseng, et al., "A Cloud Removal Approach for Aerial Image Visualization", International Journal of Innovative Computing, Information & Control, vol. 9 No. 6, pp. 2421-2440 (Jun. 2013).
United Patent Kingdom Intellectual Property Office, Combined Search and Examination Report dated Mar. 11, 2015 for GB Application No. 1417218.3.
United Kingdom Intellectual Property Office, Examination Report dated Jan. 22, 2016 for GB Patent Application No. 1417218.3 (2 pages).
United for GB Kingdom Intellectual Property Office, Combined Search and Examination Report dated Jan. 22, 2016 Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.

(56) References Cited

OTHER PUBLICATIONS

Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,717, filed May 1, 2017.
U.S. Appl. No. 15/583,801, filed May 1, 2017.
U.S. Appl. No. 15/583,680, filed May 1, 2017.
U.S. Appl. No. 15/583,740, filed May 1, 2017.
U.S. Appl. No. 15/583,759, filed May 1, 2017.
U.S. Appl. No. 15/583,773, filed May 1, 2017.
U.S. Appl. No. 15/583,786, filed May 1, 2017.
International Patent Application Serial No. PCT/CN2017/083143 filed May 5, 2017.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/U52019/064020 dated Feb. 19, 2020.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).

(56) References Cited

OTHER PUBLICATIONS

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.

Park et al., "Autonomous mobile robot navigation using passiv rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks,"in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php].

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint,"International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," from Internet Jul. 3, 2018 @ http://citeseerx.ist.psu.edu/viewdoc/download?doi=10.1.1.703.5365&rep=rep1&type=pdf, pp. 1-6.

United Kingdom Intellectual Property Office, "Combined Search and Examination Report" for GB Patent Application No. 1813580.6 dated Feb. 21, 2019.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, p. 2214-2221.

* cited by examiner

US 10,740,911 B2

METHOD, SYSTEM AND APPARATUS FOR CORRECTING TRANSLUCENCY ARTIFACTS IN DATA REPRESENTING A SUPPORT STRUCTURE

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment. Additionally, the nature of certain objects, such as those with transparent regions, may further reduce the accuracy of their detection from images of the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
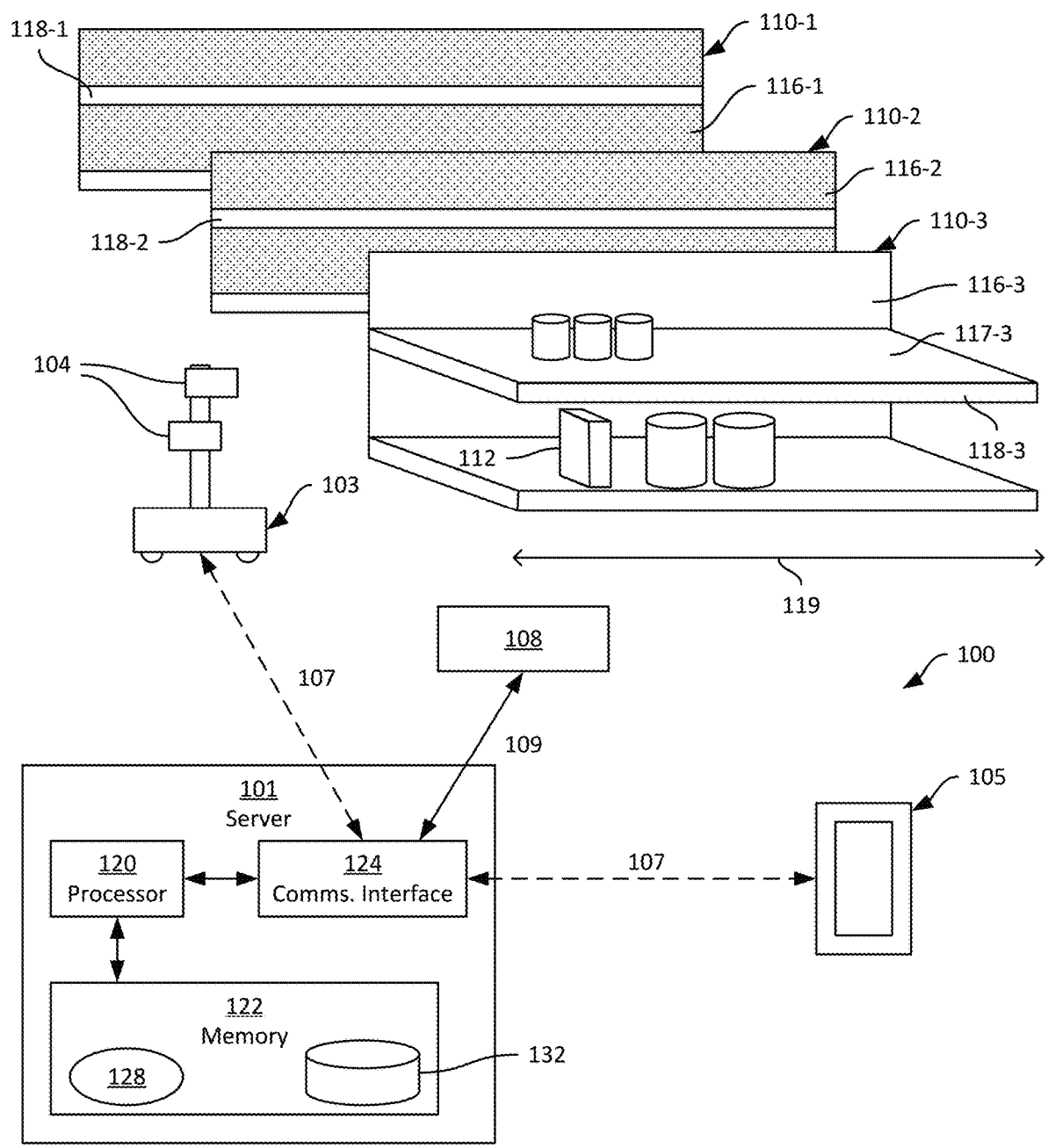
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on support structures such as shelf modules, for selection and purchase by customers. As a result, the composition of the set of products supported by any given shelf module varies over time, as products are removed and, in some cases, replaced by customers, warehouse workers, and the like. Products that have been partially or fully depleted typically require restocking, and products that have been incorrectly replaced (referred to as "plugs") typically require relocation to the correct position on the shelves. The detection of restocking or plug issues is conventionally performed by human employees, via visual assessment of the shelves and manual barcode scanning. This form of detection is labor-intensive and therefore costly, as well as error-prone.

Attempts to automate the detection of product status issues such as those mentioned above are complicated by the frequently changing nature of the environment in which an autonomous data capture system is required to operate. Among other difficulties, digital images of the shelves vary in quality depending on the available lighting, the presence of visual obstructions, and the like. Further, some objects include portions that are translucent or transparent. An example of such an object is a soda bottle, which typically includes an opaque cap and an opaque label wrapped around the midsection of the bottle, while the remainder of the bottle is translucent or transparent. Depending on the color of the fluid contained in the bottle, digital images may reveal portions of the back of the shelf through the bottle, which may in turn lead to the automated detection of inaccurate status information (e.g. indicating that a gap exists where in fact there is a translucent or transparent object). Depth measurements may also be inaccurate as a result of such transparencies, as light emitted by depth sensors (e.g. a laser beam emitted by a Light Detection and Ranging (LIDAR) sensor) may traverse the object and reflect off the back of the shelf rather than reflecting off the object itself. As those of skill in the art will realize, the system and methods disclosed herein are equally applicable to correcting both transparency and translucency artifacts. Therefore, the terms "translucent" or "translucency" and "transparent" or "transparency" are used interchangeably herein as pertaining to objects that let some or all light pass through them.

Examples disclosed herein are directed to a method in an imaging controller of correcting translucency artifacts in data representing one or more objects disposed on a shelf, including: obtaining a plurality of depth measurements captured by a depth sensor and corresponding to an area containing the shelf; obtaining (i) a definition of a plane containing edges of the shelf, (ii) a location in the plane of an upper shelf edge, and (iii) a location in the plane of a lower shelf edge adjacent to the upper shelf edge; generating a depth map containing, for each of a plurality of positions in the plane, a nearest object depth; detecting an upper object boundary in the depth map between the upper and lower support surface edges; updating each nearest object depth between the upper object boundary and the lower shelf edge to contain a depth of the upper object boundary; and storing the corrected depth map.

Additional examples disclosed herein are directed to a computing device for correcting translucency artifacts in data representing one or more objects disposed on a shelf, comprising: a memory; and an imaging controller connected to the memory, the imaging controller including: a preprocessor configured to obtain a plurality of depth measurements captured by a depth sensor and corresponding to an area containing the shelf; the preprocessor further configured to obtaining (i) a definition of a plane containing edges of the shelf, (ii) a location in the plane of an upper shelf edge, and (iii) a location in the plane of a lower shelf edge adjacent to the upper shelf edge; a map generator configured to generate a depth map containing, for each of a plurality of positions in the plane, a nearest object depth; a corrector configured to detect an upper object boundary in the depth map between the upper and lower support surface edges; and the corrector further configured to generate a corrected depth map by updating each nearest object depth between the upper object boundary and the lower shelf edge to contain a depth of the upper object boundary; and the imaging controller further configured to store the corrected depth map in the memory.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like), and is further configured to employ the sensors 104 to capture shelf data. In the present example, the apparatus 103 is configured to capture a plurality of depth measurements corresponding to the shelves 110. Each measurement defines a distance from a depth sensor on the apparatus 103 to a point on the shelf 110 (e.g., a product 112 disposed on the shelf 110 or a structural component of the shelf 110, such as a shelf edge 118 or a shelf back 116).

The server 101 includes a special purpose imaging controller, such as a processor 120, specifically designed to control the mobile automation apparatus 103 to capture data (e.g. the above-mentioned depth measurements). The processor 120 is further configured to obtain the captured data via a communications interface 124 and store the captured data in a repository 132 in a memory 122 connected with the processor 120. The server 101 is further configured to perform various post-processing operations on the captured data. In particular, as will be discussed below in greater detail, the server 101 is configured to correct translucency artifacts within the captured data.

The translucency artifacts arise from portions of products 112 that are translucent or transparent, and the server 101 is configured to correct such artifacts in the captured data to enable further downstream processing of the captured data, for example to determine product status data (e.g. to detect gaps on the shelves 110). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof and in conjunction with the other components of the server 101, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more FPGAs and/or Application-Specific Integrated Circuits (ASICs)) rather than by execution of the control application 128 by the processor 120.

Figures 2A, 2B:
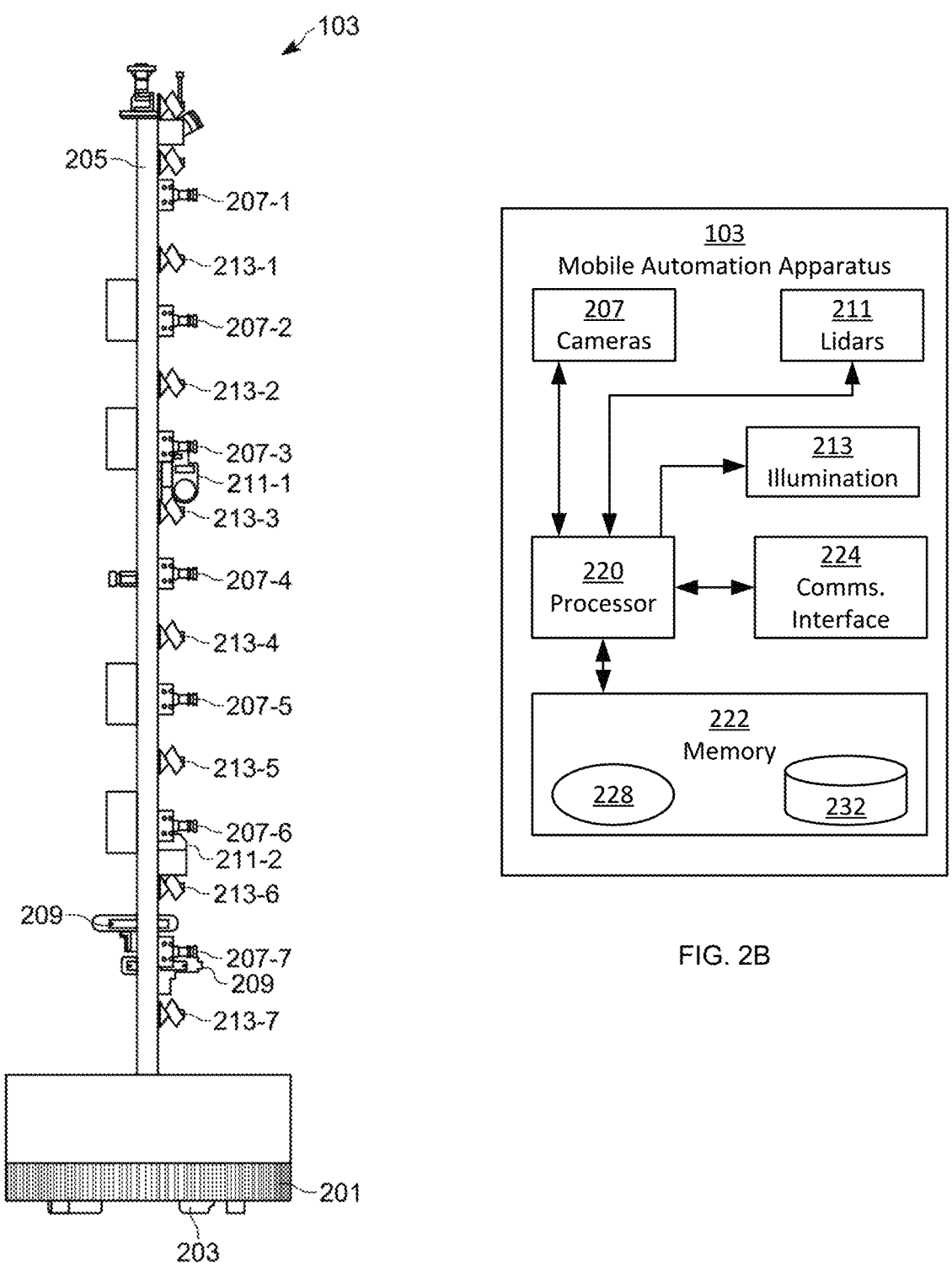
FIG. 2A depicts a mobile automation apparatus in the system of FIG. 1.
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 203) and the collection of data (e.g. image data and/or depth measurements) representing the shelves 110. The application 228 may also be implemented as a suite of distinct applications in other examples.

The processor 220, when so configured by the execution of the application 228, may also be referred to as a controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

In the present example, as discussed below, one or both of the server 101 (as configured via the execution of the control application 128 by the processor 120) and the mobile automation apparatus 103 (as configured via the execution of the application 228 by the processor 220), are configured to process depth measurements captured by the apparatus 103 to correct translucency artifacts in the depth measurements. Translucency artifacts, as referred to herein, correspond to any portions of the depth measurements corresponding to translucent or transparent portions of the products 112. One or both of the server 101 and the apparatus 103 are further configured to generate corrected data replacing the translucency artifacts, for use in downstream processing (e.g. to detect gaps between the products 112 on the shelves 110).

In further examples, the data processing discussed below may be performed on a computing device other than the server 101 and the mobile automation apparatus 103, such as the client device 105. The data processing mentioned above will be described in greater detail in connection with its performance at the server 101, via execution of the application 128.

Figure 3:
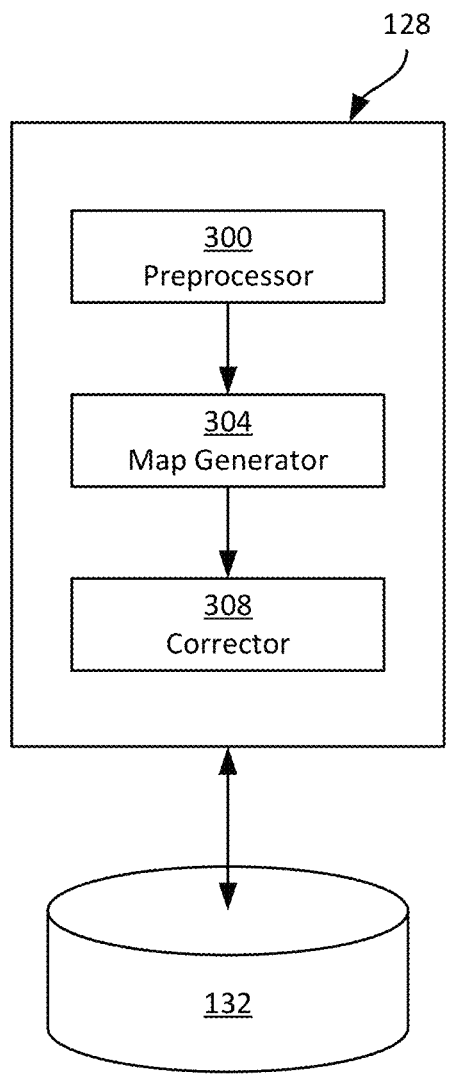
FIG. 3 is a block diagram of certain internal components of the server of FIG. 1.

Turning now to FIG. 3, before describing the operation of the application 128 to correct translucency artifacts in depth data captured by the apparatus 103, certain components of the application 128 will be described in greater detail. As will be apparent to those skilled in the art, in other examples the components of the application 128 may be separated into distinct applications, or combined into other sets of components. Some or all of the components illustrated in FIG. 3 may also be implemented as dedicated hardware components, such as one or more ASICs or FPGAs.

The control application 128 includes a preprocessor 300 configured to obtain depth measurements corresponding to the shelves 110 and the products 112 supported thereon, and to preprocess the depth measurements, for example by transforming the depth measurements between different frames of reference, to prepare the depth measurements for subsequent processing. The control application 128 also includes a map generator 304 configured to generate a two-dimensional depth map from the preprocessed depth measurements output by the preprocessor 300, which as will be apparent to those skilled in the art, typically define a three-dimensional point cloud. The control application 128 also includes a corrector 308, configured to identify the upper boundaries of objects on the shelves 110 (e.g. products 112) and to update the depth map to correct for potential translucency artifacts arising in the depth map from translucent or transparent portions of the products 112. The output of the corrector 308 may be provided to a further application, such as a gap detector executed by the server 101.

Figure 4:
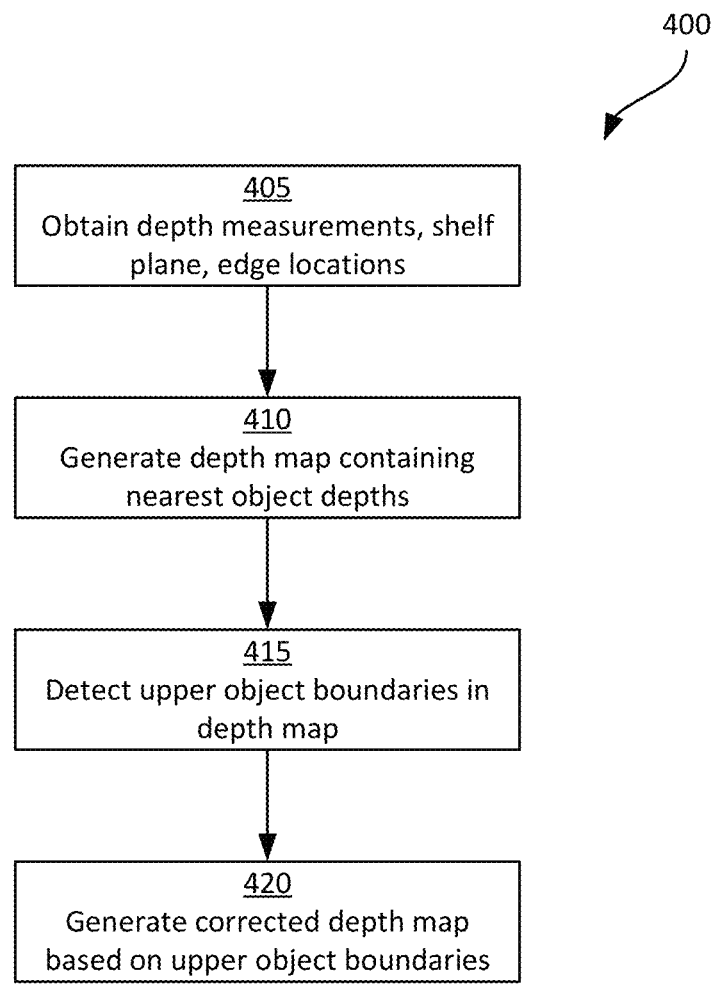
FIG. 4 is a flowchart of a method of correcting translucency artifacts.

The functionality of the control application 128 will now be described in greater detail. Turning to FIG. 4, a method 400 of correcting translucency artifacts in captured data depicting the shelves 110 is shown. The method 400 will be described in conjunction with its performance on the system 100 and with reference to the components illustrated in FIG. 3.

At block 405, the processor 120, and in particular the preprocessor 300 of the application 128, is configured to obtain a plurality of depth measurements captured by a depth sensor and representing a support structure such as a shelf module 110 and the products 112 supported thereon. The depth measurements obtained at block 405 are, for example, captured by the apparatus 103 and stored in the repository 132. The preprocessor 300 is therefore configured, in the above example, to obtain the depth measurements by retrieving the depth measurements from the repository 132.

The depth measurements can be captured in a variety of forms, according to the depth(s) sensor employed by the apparatus 103 to capture the measurements. The depth measurements obtained at block 405 are obtained in the form of a three-dimensional point cloud, which each point in the cloud having a position in a predetermined frame of reference and indicating a point on the shelves 110 at which an object was detected by the depth sensors.

Figure 5A:
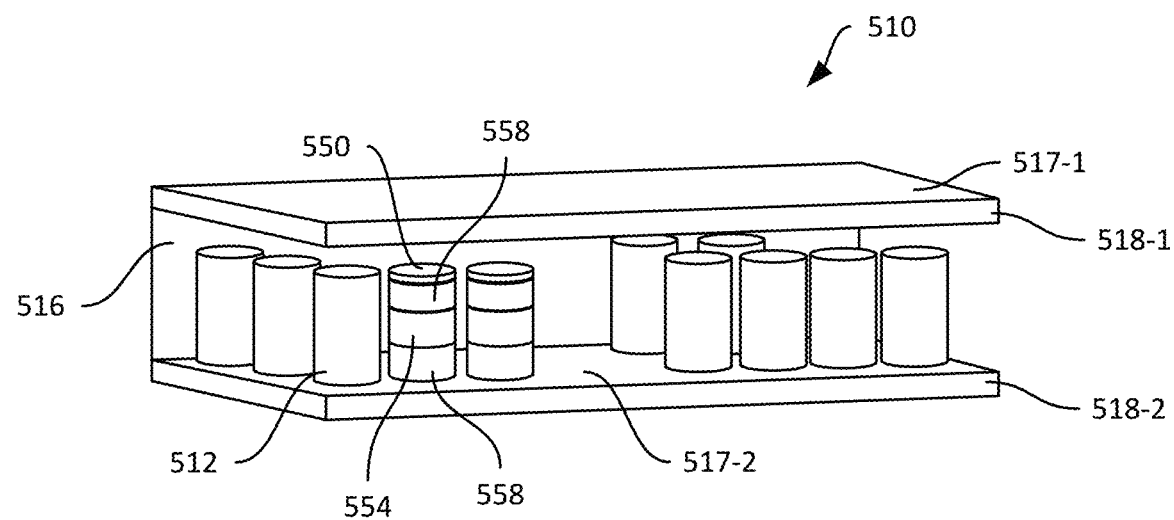
FIG. 5A depicts an example shelf arrangement.

Turning to FIG. 5A, an example shelf module 510 is illustrated, in conjunction with which the performance of the method 400 will be described. The module 510 includes a shelf back 516 extending between a pair of support surfaces 517-1 and 517-2, each having an edge 518-1 and 518-2, respectively. The support surface 517-1 is shown as being empty for simplicity of illustration. The support surface 517-2, meanwhile, is shown supporting a plurality of objects 512, such as products in a retail environment. Certain products include translucent or transparent portions. In particular, two of the products 512 illustrated in FIG. 5A include an opaque cap 550 and an opaque label 554, with the remainder of the product 512 being translucent or transparent (thus, the shelf back 516 may be visible through the translucent portions 558).

Figure 5B:
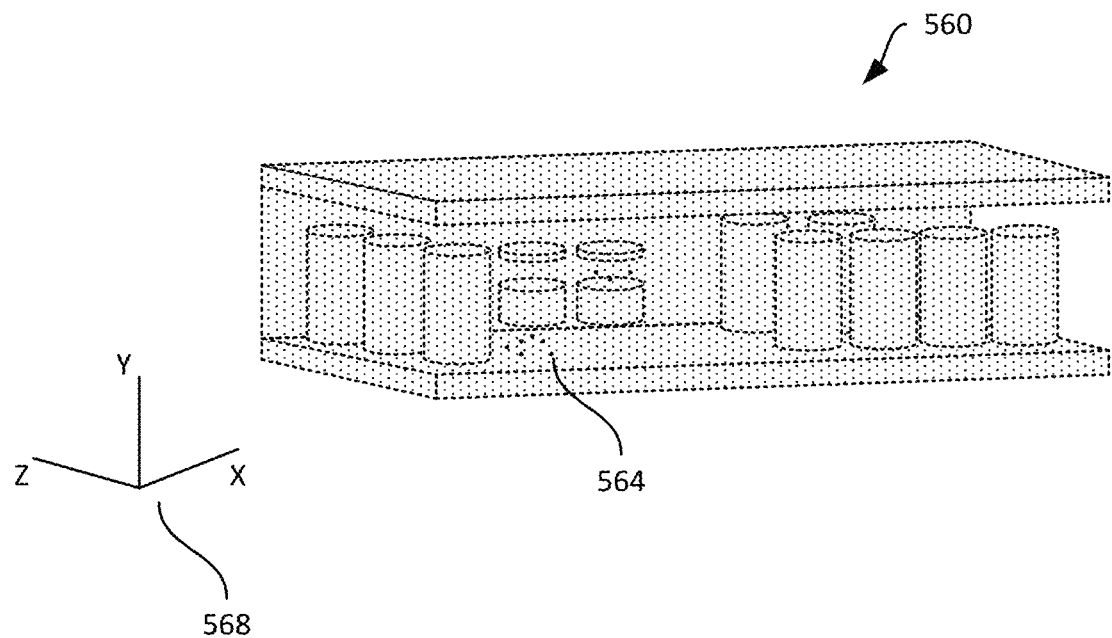
FIG. 5B depicts depth measurements corresponding to the shelf of FIG. 5A.

FIG. 5B illustrates a point cloud 560 obtained at block 405, containing depth measurements captured (e.g. by the apparatus 103) for the module 510. As seen in FIG. 5B, the translucent portions 558 of the products 512 either do not appear in the point cloud 560, or are only partially represented in the point cloud 560 (for example, by the points 564). In other words, the point cloud 560 may represent the opaque labels 554 and/or opaque caps 550 of the products 512 as floating above the support surface 517-2, because the translucent portions 558 are represented incompletely, or not at all, in the point cloud 560. As will now be apparent to those skilled in the art, a gap detection mechanism operating on the point cloud 560 may detect gaps between the caps 550 and the labels 554 and/or between the labels 554 and the support surface 517-2 where in fact such gaps are likely physically impossible. The point cloud 560 is defined according to a frame of reference 568. That is, each point in the point cloud has a position defined by coordinates according to the frame of reference 568.

At block 405, the preprocessor 300 can also be configured to obtain a representation of a shelf plane containing the edges 518, as well as data indicating the locations of the edges 518-1 and 518-2 in the plane. The detection of the shelf plane and the edge locations can be performed via the execution of a shelf plane detector and/or a shelf edge detector (e.g. at the server 101). An example shelf plane detector can be configured to process depth measurements of the modules 110 or 510 (e.g. captured by the apparatus 103 with the depth sensor 209) to select a subset of the depth measurements indicative of shelf edges (e.g. indicative of substantially vertical surfaces), and to fit a shelf plane to the selected depth measurements.

An example shelf edge detector can, for example, process images of the modules 110 or 510 (e.g. captured by the apparatus 103 with the cameras 207) to identify intensity transitions (transitions from light to dark and from dark to light) indicative of shelf edges, which are indicative of shelf edges. The shelf edge detector can produce bounding boxes corresponding to the regions (i.e. the likely shelf edges) bounded by such transitions.

Figure 6A:
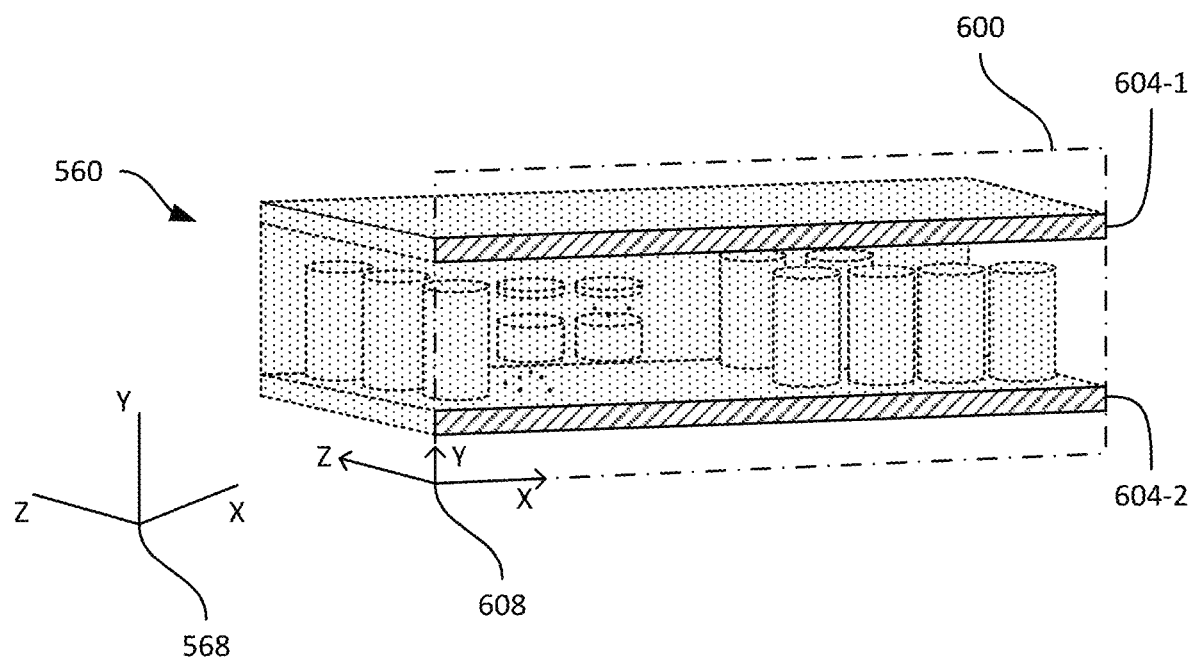
FIG. 6A depicts a shelf plane and shelf edge locations employed in the method of FIG. 4.

Turning to FIG. 6A, a shelf plane 600 is shown superimposed over the point cloud 560. Further, bounding boxes 604-1 and 604-2 indicating the locations, within the plane 600, of each of the shelf edges 518. Although the plane 600 and edge locations 604 are shown graphically in FIG. 6A, definitions for the plane 600 and the locations 604 can be obtained in any suitable format at block 405. For example, the preprocessor 300 can be configured to obtain an equation defining the plane, as well as coordinates (e.g. for each corner of the bounding boxes shown in FIG. 6A) defining the locations 604.

As will be apparent from FIG. 6A, the plane 600 and the locations 604 (as well as the underlying edges 518) are not parallel to any of the axes of the frame of reference 568. Thus, in some embodiments, to reduce the computational load imposed by subsequent processing, the preprocessor 300 is also configured to transform the point cloud 560 to align the points therein with a frame of reference 608 defined by the plane 600 itself. That is, two axes (X and Y in the illustrated example) lie within the plane 600, while the third axis (Z, or depth) is perpendicular to the plane 600. The transformation of the point cloud 560 replaces the coordinates of the points in the frame of reference 568 with coordinates indicating the same physical position, but defined in the frame of reference 608. The alignment of the point cloud 560 with the frame of reference 608 can be omitted in some embodiments.

Returning to FIG. 4, at block 410 the map generator 304 is configured to generate a depth map from the point cloud 560. The depth map contains, for each of a plurality of positions in the plane 600 (i.e. for each position in a two-dimensional grid within the plane 600), a nearest object depth. The nearest object depth for a given position within the plane 600 indicates the distance from the plane 600, in a direction parallel with the Z axis of the frame of reference 608, to the first object (e.g. a product 512 or the shelf back 516) encountered while travelling in that direction. Various mechanisms are contemplated for generating the depth map. For example, the depth map may be generated by traversing each point on the plane 600 and selecting the first point in the point cloud 560 appearing along a ray traced from the plane 600 in the Z direction. However, such an approach may include noise or other artifacts appearing in the point cloud 560. The map generator 304 is therefore configured, in the present example, to generate the depth map according to the method shown in FIG. 7.

Figure 6B:
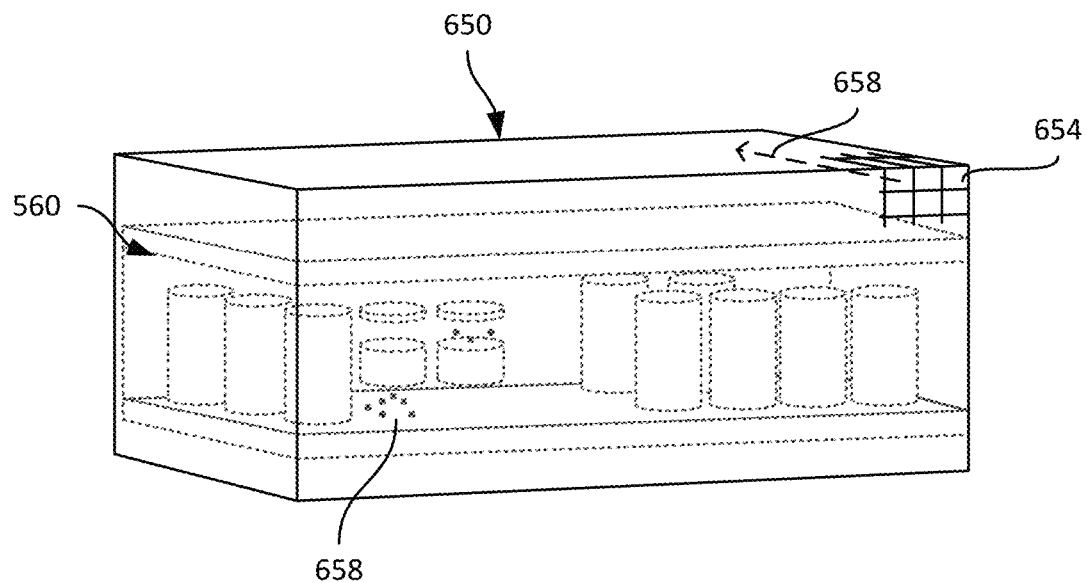
FIG. 6B depicts a three-dimensional grid applied to the depth measurements shown in FIG. 5B in the method of FIG. 4.
Figure 7:
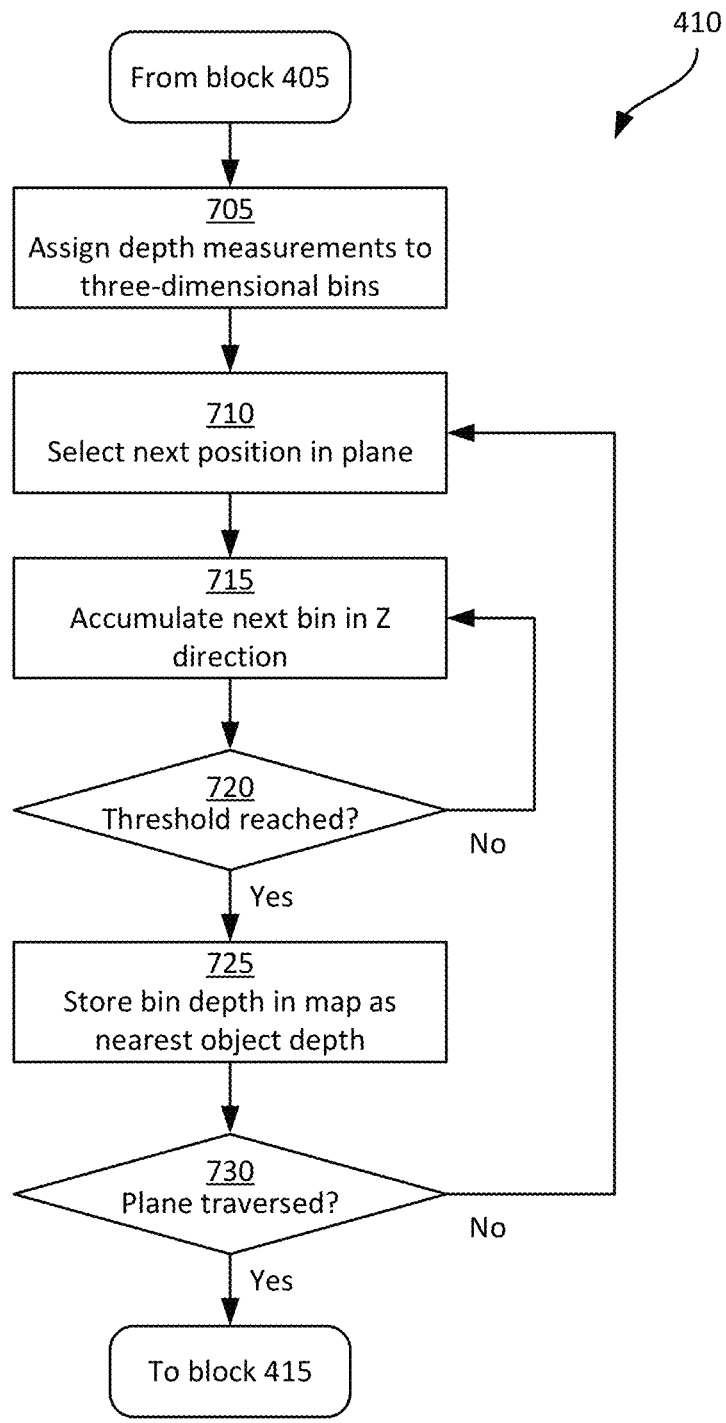
FIG. 7 is a flowchart of a method for generating a depth map.

Turning to FIG. 7, at block 705, the map generator is configured to assign the depth measurements in the point cloud to a three-dimensional grid of bins. Returning briefly to FIG. 6B, a grid 650 of individual bins 654 is shown superimposed over the point cloud 560. The resolution of the grid is, in some examples, about 1 cm×1 cm×1 cm (i.e. each bin 654 has a size of one cubic centimeter). In other examples, however, higher or lower grid resolutions may be employed by the map generator 304. As will now be apparent from FIG. 6B, each bin 654 encompasses a region of the point cloud 560. The map generator 304 is configured to determine a count for each bin 654 based on the number of points in the point cloud that are encompassed by that bin 654. Thus, bins encompassing the surfaces of products 512 or shelf edges 518 will tend to have elevated counts, whereas bins encompassing regions of the point cloud that correspond to gaps between products 512 or the translucent portions 558 will tend to have lower counts.

Following the performance of block 705, the map generator 304 has therefore generated a three-dimensional array of bin counts. The map generator 304 is then configured to generate a value for one point (which may also be referred to as a pixel) in the two-dimensional depth map for each of a plurality of positions on the plane 600. Thus, at block 710, the map generator 304 is configured to select a position in the plane 600 for which to generate the next depth map value (i.e. the next nearest object depth).

In the present example, the positions selected at successive performances of block 710 correspond to the intersections of the grid 650 with the plane 600. At block 715, for the selected position the map generator 304 is configured to begin traversing the grid of bins in the Z direction (i.e. in a direction parallel to the Z axis of the frame of reference 608, which is perpendicular to the plane 600). Returning briefly to FIG. 6B, the arrow 658 indicates the direction of travel initiated following a selection (at block 710) of the bin third from the left in the top row of the grid 650.

As will be apparent, traversing the grid 650 as described above results in traversing a stack of bins aligned with the Z axis. At block 715, the map generator 304 is configured to add the count of the first bin to an accumulated count. At block 720, the map generator is configured to determine whether the accumulated count has reached a predefined threshold. The threshold is selected based on the resolution of the point cloud 560 and of the grid 650, and is set at a number of points that is sufficiently high as to indicate the likely presence of an object (rather than, for example, noise, dust, or other data capture artifacts). When the threshold has not been reached at block 720, the map generator returns to block 715, advances to the next bin along the path of travel (e.g. the arrow 658), and repeats the above process.

When the determination at block 720 is affirmative, the map generator 304 is configured at block 725 to store the depth of the most recently accumulated bin in the depth map as the nearest object depth. The map generator 304 is then configured to determine, at block 730, whether the plane 600 has been fully traversed. More specifically, the map generator 304 is configured to determine whether a portion of the plane 600 encompassing the entirety of the shelf edges 518 (as indicated by the locations 604) has been traversed. When the determination is negative at block 730, the map generator 304 returns to block 710, selects the next position in the plane 600, and repeats the above process. When the determination at block 730 is affirmative, however, the depth map is complete and the performance of the method 400 proceeds to block 415.

Figure 8A:
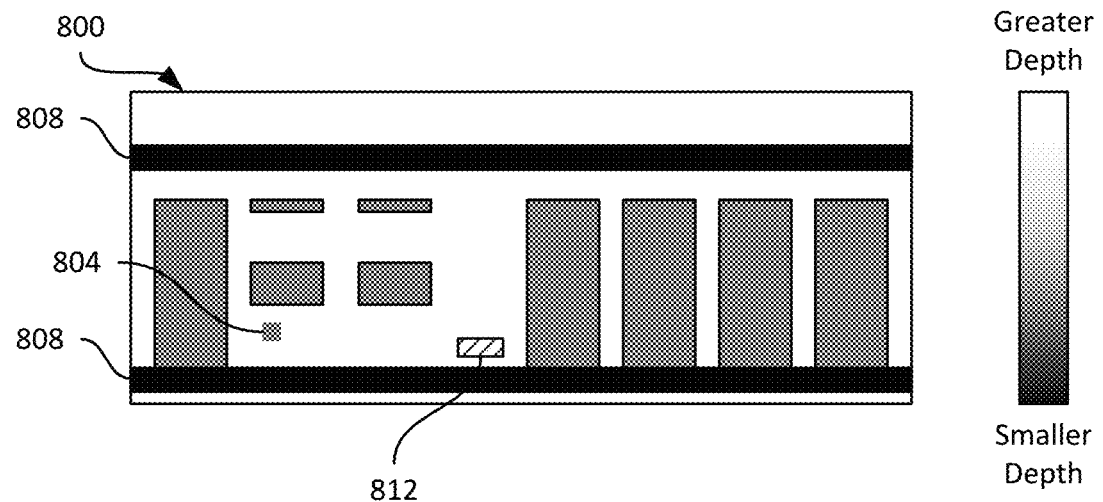
FIG. 8A illustrates an example depth map generated via the performance of the method of FIG. 7.

Turning to FIG. 8A, an example depth map 800 generated from the point cloud 560 as described above is shown. The values of each pixel in the depth map are shown in grayscale in FIG. 8A, with lighter values indicating greater depths (i.e. nearest object depths further from the plane 600), and darker values indicating smaller depths (i.e. nearest object depths closer to the plane 600). In some embodiments, the depth map 800 may be converted to a grayscale image as shown in FIG. 8A (e.g. the nearest object depths converted to grayscale values between zero and 255). As seen in the depth map 800, the products 512, with the exception of the transparent portions 558, appear as regions of limited depth in the map 800, while the transparent portions 558 appear (incorrectly) as regions having greater depth. A region 804 indicates that although a transparent region 558 was not detected in its entirety in the point cloud 560, a sufficient number of points were detected to populate some values of the depth map. Further regions 808 of the depth map indicate the locations of the shelf edges 518, having zero or near-zero depth (since the shelf edges 518 substantially coincide with the plane 600).

Also illustrated in the depth map 800 is a region 812 containing a null value. The region 812 indicates missing data in the point cloud 560. For example, the depth sensor(s) employed to capture the point cloud 560 may not have collected sufficient depth measurements to reach the threshold at block 720 for the pixels of the map 800 within the region 812. Causes of such missing data can include shadows, reflections, obstructions and the like in the environment in which the depth measurements were captured, preventing the depth sensors from consistently detecting the shelf back 516.

Figure 8B:
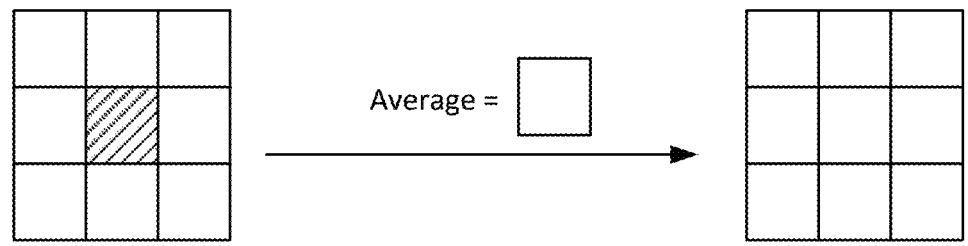
FIG. 8B illustrates the performance of a leaky convolution operation to correct a null value in the depth map of FIG. 8A.
Figure 8C:
FIG. 8C illustrates an updated depth map following the correction of null values.

In some examples, the map generator 304 is configured to perform a depth inpainting procedure on the map 800 to populate any pixels in the map 800 that do not contain values. In the present example, the inpainting (e.g. performed responsive to an affirmative determination at block 730) is performed via a convolution operation. As will be apparent to those skilled in the art, a convolution operation includes, for each pixel of the map 800, determining the average of the nine surrounding pixels, as shown in FIG. 8B. In the present example, the convolution operation is referred to as a leaky convolution, as the output (i.e. the average of the neighboring pixels) is placed in the central pixel. Thus, in an updated depth map 800a, as shown in FIG. 8C, the region 812 has been populated with nearest object depths.

Returning to FIG. 4, at block 415 the corrector 308 is configured to detect upper object boundaries in the depth map produced at block 410. As will be seen in the discussion below, the corrector 308 is configured based on the premise that the products 512 typically have opaque upper components (e.g. the cap 550) even when they include translucent portions. The configuration of the corrector 308 is further premised on the knowledge that the detectable upper components of the products 512 are supported by a continuous object below the detected upper component. In other words, the corrector 308 operates on the premise that the detectable upper components of the products 512 do not float above the corresponding shelf support surface 517. The corrector 308 is therefore configured to first detect the upper object boundaries at block 415 (e.g. corresponding to the opaque upper portions of the products 512), and then to correct the depth map based on such detections at block 420.

Figure 9:
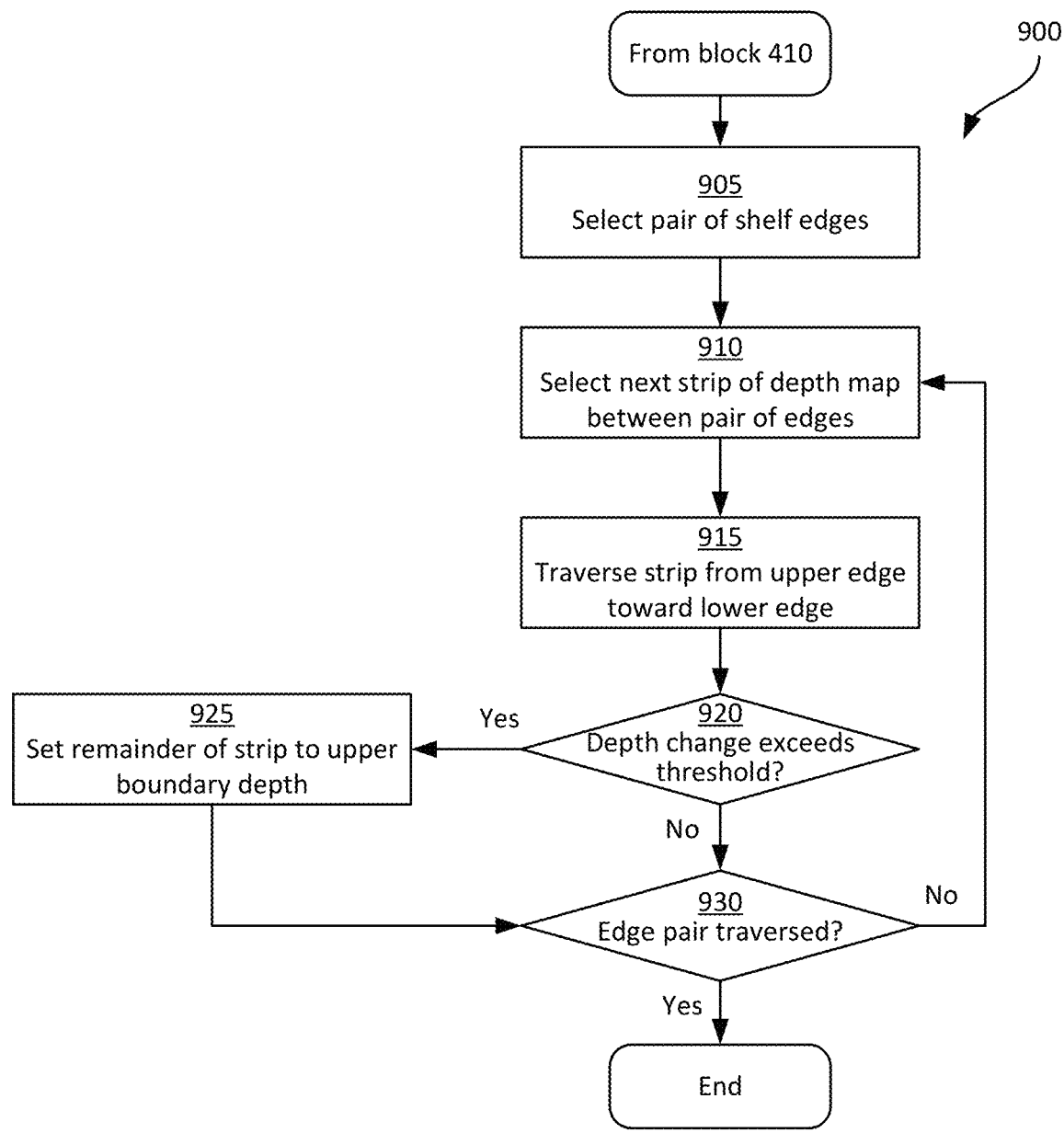
FIG. 9 is a flowchart of a method for detecting upper object boundaries and generating a corrected depth map.

In some examples, the corrector 308 is configured to detect upper object boundaries and generated a corrected depth map according to a method 900 shown in FIG. 9. That is, the method 900 is an example method for performing blocks 415 and 420 of the method 400. At block 905, the corrector 308 is configured to select an adjacent pair of shelf edges 516 (i.e. a pair of shelf edges 516 with no intervening shelf edge 516). The selection at block 905 is based on the locations 604 obtained at block 405. In the present example performance of the method 400, only two locations, 604-1 and 604-2 are available for selection, and the corrector 308 therefore selects the locations 604-1 and 604-2 at block 905.

Figure 10A:
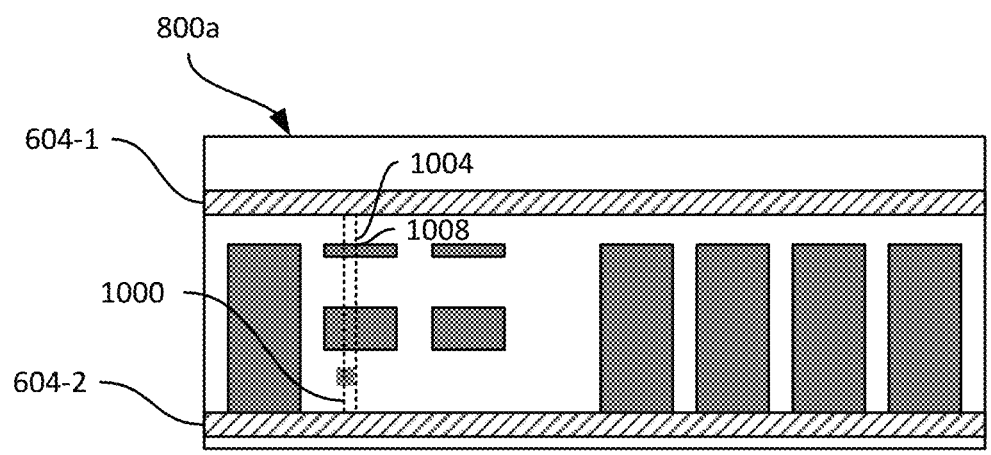
FIGS. 10A, 10B and 10C illustrate the generation of a corrected depth map according to the method of FIG. 9.

At block 910, the corrector 308 is configured to select a strip of the depth map 800a between the selected shelf edge locations 604. Specifically, the strip selected at block 910 extends vertically (i.e. parallel with the Y axis of the frame of reference 608) from the upper location 604-1 to the lower location 604-2. The width of the strip selected at block 910 can be one pixel, but is not limited to one pixel. For example, a strip having a width equal to the expected width of a product 512 can be selected. Preferably the strip does not have a width greater than the expected width of a product 512. Referring to FIG. 10A, an example strip 1000 of the depth map 800a is illustrated extending between the locations 604-1 and 604-2 (which have been superimposed on the map 800a for illustrative purposes).

Referring again to FIG. 9, at block 915, the corrector 308 is configured to traverse the selected strip from the upper shelf edge (i.e. the location 604-1 as shown in FIG. 10A) toward the lower shelf edge (i.e. the location 604-2 as shown in FIG. 10A). The corrector 308 is further configured, at block 920, to determine whether a change in depth from one traversed position to the next exceeds a preconfigured threshold. The threshold is selected such that a change in depth exceeding the threshold indicates the presence of a product 512. For example, the threshold can be set at the depth of a product 512. Returning to FIG. 10, it will be apparent that in traversing the strip 1000 from the position 1004 to the position 1008, the corrector 308 detects a change in depth equal to the distance from the shelf back 516 to the surface of a product 512 (specifically, a cap 550) facing the plane 600. When the distance is greater than the threshold, an affirmative determination at block 920, corresponding to the detection of an upper object boundary, leads to the performance of block 925.

In some examples, the threshold against which changes in depth are assessed includes a directionality criterion. For example, the threshold can be set at the depth of a product 512, and can also require that the depth change be a decrease in depth, indicating a change away from the back of the shelf 516 and towards the shelf plane 600. Thus, for example, when a label is suspended below a shelf edge 518 (such labels may also be referred to as a "talkers"), two changes in depth may be detected as a strip is traversed: a change in depth indicating a transition from the talker to the back of the shelf, and a change in depth indicating a transition from the back of the shelf to a product 512. The first of the above changes, being an increase in depth rather than a decrease, does not satisfy the threshold at block 920.

At block 925, the corrector 308 is configured to set the depth values (i.e. the nearest object depths) in the remainder of the strip to a value equal to the depth of the upper object boundary. In other words, block 925 is an example implementation of block 420, in that the performance of block 925 generates a corrected portion of the depth map 800 based on the detected upper boundary.

Figure 10B:
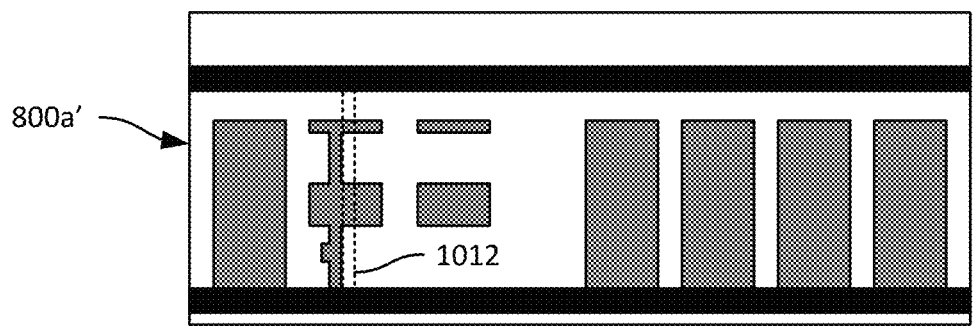

FIG. 10B illustrates a partially corrected depth map 800a', in which the remainder of the strip 1000 (that is, the portion of the strip 1000 below the boundary detected at the position 1008 in FIG. 10A) is updated to contain the same depth as the depth of the position 1008. As a result, as shown in FIG. 10B, the transparent portions 558 of the product 512 are partly reconstituted in the partially corrected depth map 800a'.

Following the performance of block 925, the corrector 308 is configured to proceed to block 930. A negative determination at block 920 also leads directly to block 930, bypassing block 925. At block 930, the corrector 308 determines whether the length (i.e. in the X direction, parallel to the length 119 shown in FIG. 1) of the edge locations selected at block 905 has been traversed. When the determination at block 930 is negative, the corrector 308 is configured to return to block 910, select the next strip of the depth map 800a' (e.g. the strip 1012 as shown in FIG. 10B), and repeat the performance of blocks 915 to 930 as described above. When the determination at block 930 is affirmative, indicating that the entire area between the pair of edge locations selected at block 905 has been traversed, the method 900 ends. In some examples, rather than ending the method 900 can be repeated for any remaining pairs of shelf edges 516.

Figure 10C:
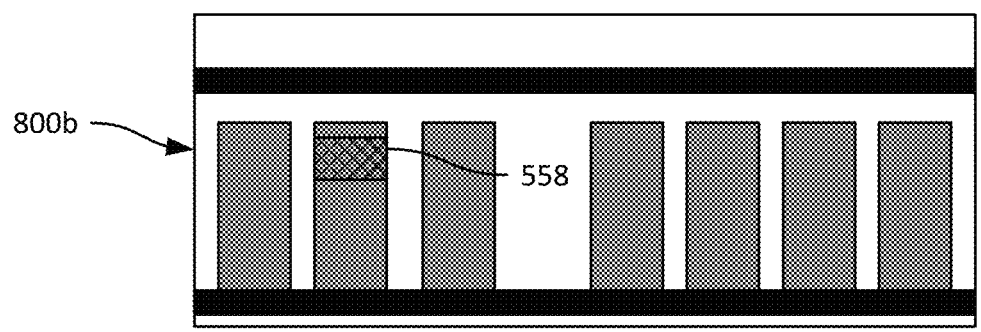

FIG. 10C illustrates the result of processing the depth map 800 via performance of the method 900. In particular, FIG. 10C depicts a corrected depth map 800b, in which portions of the depth map 800 that incorrectly omitted transparent portions 558 of products 512 have been updated to correctly depict the transparent portions 558 (an example of which is highlighted in cross-hatching).

Following the completion of the method 900, the application 128 can be configured to present the corrected depth map 800b to a further application (not shown), such as a gap detector application configured to detect gaps between products 512. As will now be apparent, the corrected depth map 800b may enable such a gap detector to more accurately detect gaps by reducing the likelihood that transparent portions 558 of the products 512 will lead to the detection of false positives by the gap detector (i.e. gaps detected where there are in fact not gaps, but rather translucent products 512).

In other examples, the corrector 308 is configured to generate bounding boxes (e.g. via execution of a suitable edge detection algorithm) corresponding to the products 512 as represented in the corrected depth map 800b, for presentation to the gap detector mentioned above.

The gap detector may, for example, identify gaps between products 512 based on images captured by the apparatus 103 of the modules 110 or 510. For example, the gap detector may be configured to detect portions of such images depicting a pattern associated with the shelf back 516. Such portions indicate that the shelf back is visible between products 512, and therefore indicate the presence of gaps. As will now be apparent, in the absence of the corrected depth map, such image-based gap detection may incorrectly detect gaps where in fact the transparent portions 558 of the products 512 are present, because the pattern of the shelf back 516 may be visible through the translucent portions 558. In other examples, the gap detector may be configured to identify gaps between products 512 based on depth measurements obtained by the apparatus 103 for the modules 110 or 510. As noted earlier, depth measurements corresponding to products 512 with translucent regions may inaccurately represent those products 512, leading to false positive gap detections. The corrected depth map described above may therefore be provided to such a depth-based gap detector to mitigate inaccuracies introduced in the depth measurements by the translucent regions.

Variations to the above systems and methods are contemplated. For example, the updating of nearest object depths at block 925 can be performed by updating only a subset of the nearest object depths in the strip 1000. For example, only the nearest object depths greater than the depth of the upper object boundary by a predefined threshold (e.g. the threshold noted above, or a smaller threshold) may be updated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in an imaging controller of correcting translucency artifacts in data representing one or more objects disposed on a shelf, comprising:
   obtaining a plurality of depth measurements captured by a depth sensor and corresponding to an area containing the shelf;
   obtaining (i) a definition of a plane containing edges of the shelf, (ii) a location in the plane of an upper shelf edge, and (iii) a location in the plane of a lower shelf edge adjacent to the upper shelf edge;
generating a depth map containing, for each of a plurality of positions in the plane, a nearest object depth;
detecting an upper object boundary in the depth map between the upper and lower shelf edges;
generating a corrected depth map by updating each nearest object depth between the upper object boundary and the lower shelf edge to contain a depth of the upper object boundary; and
storing the corrected depth map.

2. The method of claim 1, further comprising presenting the corrected depth map to a gap detector for use in detecting gaps on the shelf.

3. The method of claim 1, further comprising:
prior to generating the depth map, aligning the depth measurements with a frame of reference based on the plane.

4. The method of claim 1, wherein generating the depth map includes generating each nearest object depth by:
assigning each depth measurement to one of a plurality of bins arranged in a three-dimensional grid, to generate a count of depth measurements falling within each bin;
for each of the plurality of positions in the plane, traversing a subset of the bins in a direction perpendicular to the plane and accumulating the respective counts of the subset of bins until the accumulated counts reach a threshold; and
setting the nearest object depth as a depth of a final one of the subset of bins traversed.

5. The method of claim 1, wherein detecting the upper object boundary comprises:
beginning at the location of the upper shelf edge, traversing a strip of the depth map from the location of the upper shelf edge toward the location of the lower shelf edge; and
determining whether a change in depth between traversed positions in the strip exceeds a predefined threshold.

6. The method of claim 5, wherein the predefined threshold defines a decrease in depth.

7. The method of claim 5, wherein generating the corrected depth map comprises setting the nearest object depths of each position in the strip between the upper object boundary and the location of the lower shelf edge to the depth of the upper object boundary.

8. The method of claim 5, wherein the strip is a line.

9. The method of claim 5, wherein the strip has a predefined width greater than one nearest object depth value.

10. The method of claim 1, further comprising:
prior to generating the corrected depth map, correcting null values in the depth map by performing a leaky convolution on the depth map.

11. A computing device for correcting translucency artifacts in data representing one or more objects disposed on a shelf, comprising:
a memory; and
an imaging controller connected to the memory, the imaging controller including:
a preprocessor configured to obtain a plurality of depth measurements captured by a depth sensor and corresponding to an area containing the shelf;
the preprocessor further configured to obtain (i) a definition of a plane containing edges of the shelf, (ii) a location in the plane of an upper shelf edge, and (iii) a location in the plane of a lower shelf edge adjacent to the upper shelf edge;
a map generator configured to generate a depth map containing, for each of a plurality of positions in the plane, a nearest object depth;
a corrector configured to detect an upper object boundary in the depth map between the upper and lower shelf edges; and
the corrector further configured to generate a corrected depth map by updating each nearest object depth between the upper object boundary and the lower shelf edge to contain a depth of the upper object boundary; and
the imaging controller further configured to store the corrected depth map in the memory.

12. The computing device of claim 11, wherein the imaging controller is further configured to present the corrected depth map to a gap detector for use in detecting gaps on the shelf.

13. The computing device of claim 11, wherein the preprocessor is further configured, prior to generation of the depth map, to aligning the depth measurements with a frame of reference based on the plane.

14. The computing device of claim 11, wherein the map generator is configured to generate each nearest object depth by:
assigning each depth measurement to one of a plurality of bins arranged in a three-dimensional grid, to generate a count of depth measurements falling within each bin;
for each of the plurality of positions in the plane, traversing a subset of the bins in a direction perpendicular to the plane and accumulating the respective counts of the subset of bins until the accumulated counts reach a threshold; and
setting the nearest object depth as a depth of a final one of the subset of bins traversed.

15. The computing device of claim 11, wherein the corrector is further configured to detect the upper object boundary by:
beginning at the location of the upper shelf edge, traversing a strip of the depth map from the location of the upper shelf edge toward the location of the lower shelf edge; and
determining whether a change in depth between traversed positions in the strip exceeds a predefined threshold.

16. The computing device of claim 15, wherein the predefined threshold defines a decrease in depth.

17. The computing device of claim 15, wherein the corrector is further configured to generate the corrected depth map by setting the nearest object depths of each position in the strip between the upper object boundary and the location of the lower shelf edge to the depth of the upper object boundary.

18. The computing device of claim 15, wherein the strip is a line.

19. The computing device of claim 15, wherein the strip has a predefined width greater than one nearest object depth value.

20. The computing device of claim 11, wherein the map generator is further configured to:
prior to generating the corrected depth map, correct null values in the depth map by performing a leaky convolution on the depth map.

* * * * *